No. 886,068. PATENTED APR. 28, 1908.
A. POTTER.
APPARATUS FOR THE CHEMICAL TREATMENT OF WATER.
APPLICATION FILED JAN. 14, 1907.
3 SHEETS—SHEET 1.
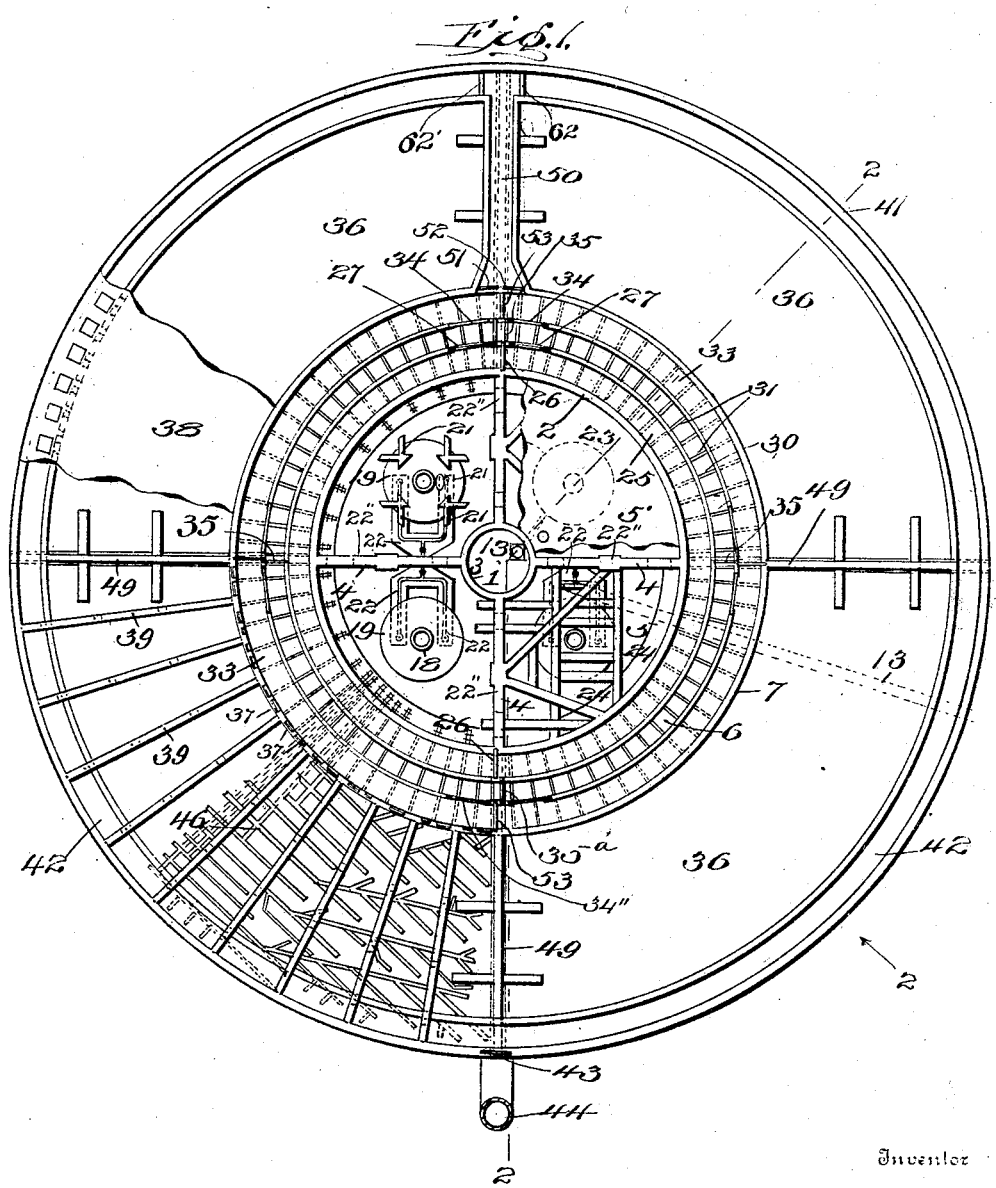

No. 886,068. PATENTED APR. 28, 1908.
A. POTTER.
APPARATUS FOR THE CHEMICAL TREATMENT OF WATER.
APPLICATION FILED JAN. 14, 1907.
3 SHEETS—SHEET 2.
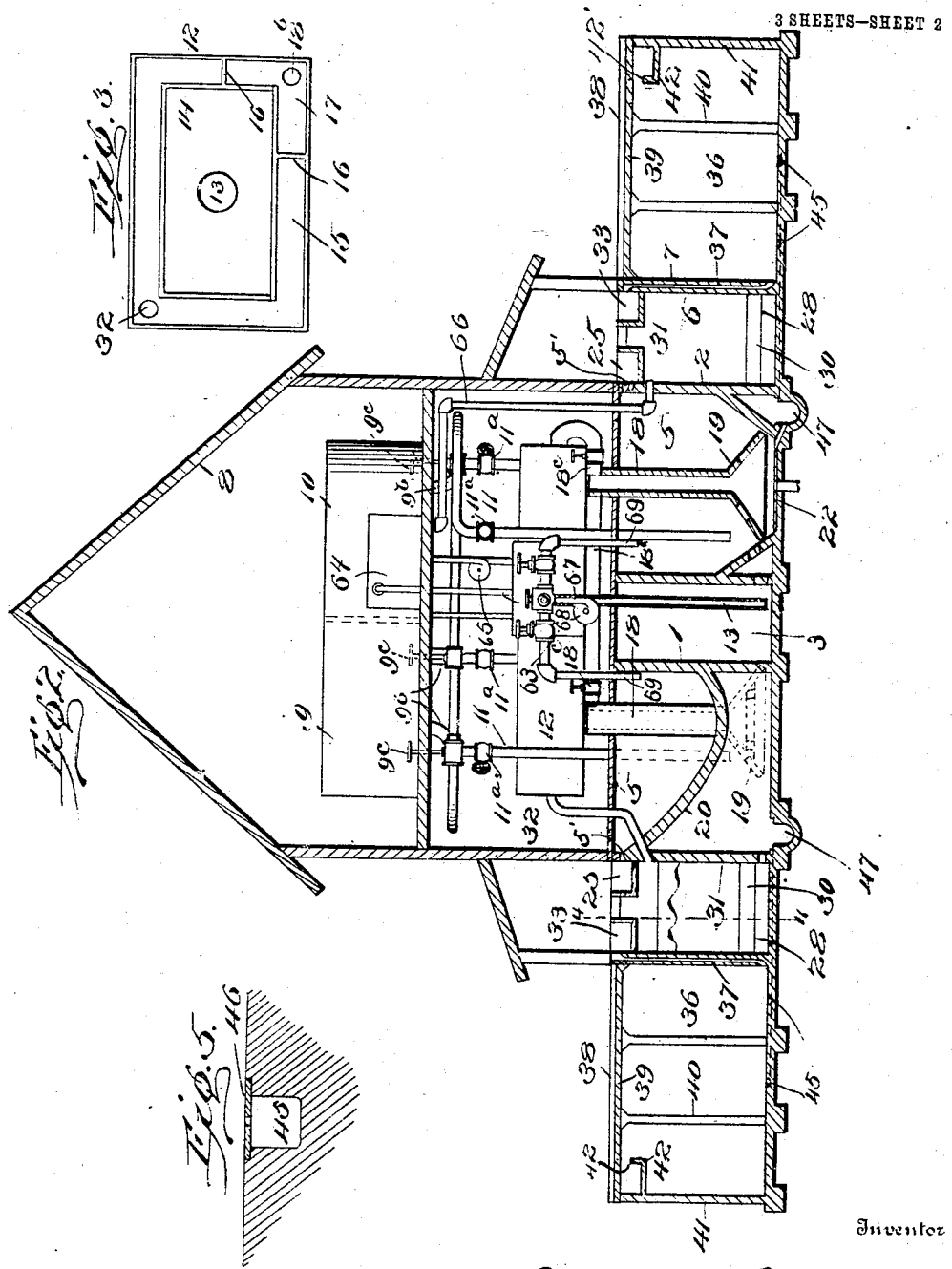
Witnesses
J. M. Fowler Jr.
H. S. Hill
Inventor
Alexander Potter
By Mason Fenwick & Lawrence
Attorneys No. 886,068. PATENTED APR. 28, 1908.
A. POTTER.
APPARATUS FOR THE CHEMICAL TREATMENT OF WATER.
APPLICATION FILED JAN. 14, 1907.
3 SHEETS—SHEET 3.
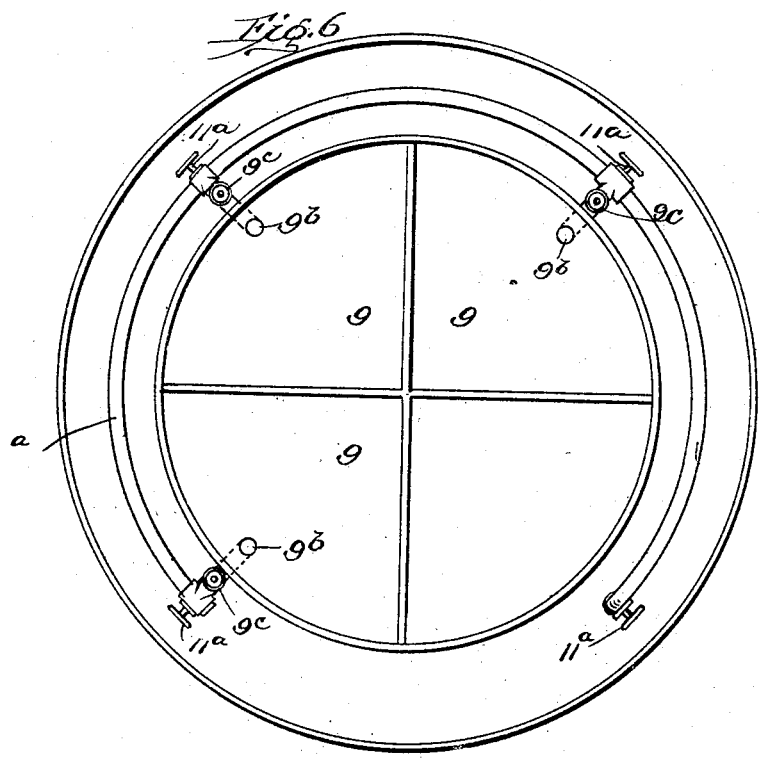
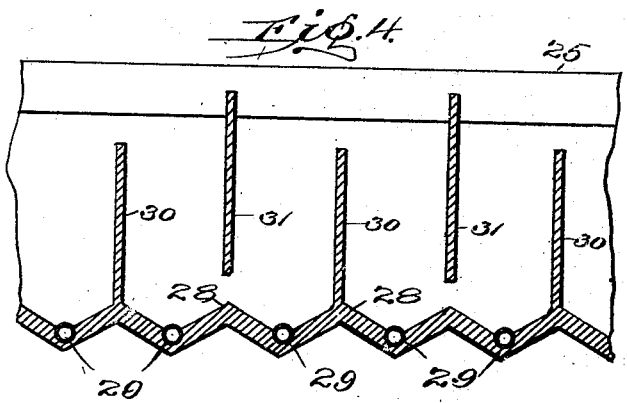

UNITED STATES PATENT OFFICE.

ALEXANDER POTTER, OF NEW YORK, N. Y.

APPARATUS FOR THE CHEMICAL TREATMENT OF WATER.

No. 886,068.  Specification of Letters Patent.  Patented April 28, 1908.

Application filed January 14, 1907. Serial No. 352,280.

*To all whom it may concern:*

Be it known that I, ALEXANDER POTTER, a citizen of the United States, residing at New York, in the county of New York and State of New York, have invented certain new and useful Improvements in Apparatus for the Chemical Treatment of Water; and I do hereby declare the following to be a full, clear, and exact description of the invention, such as will enable others skilled in the art to which it appertains to make and use the same.

The present invention relates to an improved device for the treatment of water or other liquids with chemicals for the softening of the same or for other useful purposes.

The object of the invention is to provide novel means whereby the chemicals can be thoroughly and at the same time economically mixed with large quantities of liquid by an economical distribution of structural material, and whereby great perfection of treatment and through centralization, great ease of operation are attained.

To this end the plant comprising the present invention consists essentially of a plurality of basins wherein a portion of the total quantity of water is treated with the chemicals, a circulation channel or channels surrounding the basins wherein the remaining portion of the water is thoroughly mixed with that portion treated with the chemicals in the above mentioned basins, and a settling basin, or basins, surrounding the circulation channels.

With these and other objects in view, the invention comprises certain other novel constructions, combinations and arrangements of parts, as will be hereinafter more fully described and claimed.

In the drawings:—Figure 1 is a top plan view of my improved plant as applied to the chemical treatment of water, the superstructure being removed and portions being broken away to more clearly illustrate the invention. Fig. 2 is a vertical, sectional view through the plant. Fig. 3 is a top plan view of the weir box. Fig. 4 is an enlarged longitudinal, sectional view through a portion of the circulation chamber or baffled mixing tank. Fig. 5 is an enlarged view showing the construction of the under drains in the outer chamber. Fig. 6 is a diagrammatic top plan view of the lime and soda tanks with means for discharging material therefrom to the saturators.

The numerals 1 and 2 designate two concentric walls, the inner wall 1 defining a well 3. These two concentric walls 1 and 2 are connected by a series of radial walls 4, preferably four in number, forming the sector shaped basins 5, which, in the present instance, are in the form of a quadrant. Surrounding the outer wall 2 is a circulation or baffled mixing chamber 6 designed to receive the overflow from the basins 5 and inclosed by a wall 7 which is spaced from the wall 2. This circulation or mixing chamber may be an apartment of an approved character, and performs the function of thoroughly mixing the overflow from the sector-shaped basins, and the remainder of the water supply which, as will be hereinafter more fully described, does not pass through the said basins.

Positioned over the basins 5 is a superstructure 8 of a suitable nature which preferably forms a housing and is designed to support the elevated tanks 9 and 10 containing chemicals with which it is desired to treat the water. Under some conditions it may be desirable, as in the present instance, that these tanks 9 and 10 simply constitute sector-shaped portions of a large tank which may be circular in outline or have any suitable shape. In the present instance four of these tanks are shown, three of the tanks being designed to contain a mixture of lime and water, and the other tank a solution of carbonate of soda. The delivery of the lime mixture into the various basins 5 is brought about by means of the pipes 11. The pipes 11 are arranged in any approved manner so that either of said pipes may receive chemical solution from either or all of the lime tanks 9 and that either or all of said pipes 11 may be closed to prevent the flow of chemical solution therethrough. Provision is also made for closing the connection between either or all of the lime tanks 9 to and with the pipes 11. In Fig. 6 is shown diagrammatically means for regulating the flow as above described, wherein a pipe is disposed beneath the tanks 9 and curved to conform substantially with the periphery of said tanks. Pipes $9^b$ lead from said tanks 9 downwardly and connect with the curved pipe $9^a$ and flow of liquid through the said pipes $9^b$ is controlled by means of valves or cocks 9ᶜ. From the curved pipe 9ᵃ the pipes 11 extend downwardly, and the flow of liquid through the said pipes 11 is controlled by means of valves 11ᵃ.

While any other means for properly conducting fluid material from the tanks 9 to the basins 5 may be employed, it will be seen that the employment of the device herein diagrammatically shown, will permit the introduction of fluid material from either or all of the tanks 9 to the curved pipe 9ᵃ, and that such fluid material may be conducted from the said pipe 9ᵃ through either or all of the vertical pipes 11 into either or all of the basins 5, and such flow controlled by means of the valves 11ᵃ. The mixture from the soda tank 10 is first led into a reservoir 63 from which it is pumped by any suitable means into the soda regulating box 64, such pumping means being shown conventionally at 65.

From the regulating box 64 the soda mixture is delivered in the required quantities to the circulation chamber 6, through the pipe 66, the excess in said box 64 over the required amount flowing back into the reservoir 63 through the pipe 67. The amount of soda discharged into the circulation chamber 6 may be automatically regulated by the height of the water in the weir box 12, hereinafter described and by any suitable form of apparatus such as that disclosed in the patent to Sutro No. 765,259. The superstructure 8 also incloses the weir box 12, above referred to, communicating centrally directly with any suitable source of water supply such as indicated by the water main 13. This weir box 12 comprises the body portion 14 surrounded by an annular trough 15 receiving the overflow from the body portion 14. Partitions 16 set off a portion of the annular trough 15 adapted to receive any predetermined percentage of the total quantity of the water passing through the weir. Leading downwardly into each of the sector basins 5 is a down-take 18, the upper portions of which are in communication with a pipe 18ᵃ communicating with the opening 18ᵇ in the bottom of the compartment 17 of the weir box. The pipe 18ᵃ is provided with valves 18ᶜ by which the flow from the compartment 17 to the several sector-shaped basins 5 may be controlled so that liquid may be conducted from the said compartment 17 into any or all of the said sector-shaped basins 5, whereby as many of said basins as may be found expedient may be employed in the battery, while the remaining basins are out of commission and may be cleansed or otherwise used as found desirable.

The bottoms 20 of the sector-shaped basins 5 have a curved formation with a depression at approximately the central portion, the above-mentioned down-takes 18 are provided at their lower ends with inverted funnel-shaped members 19 positioned over the depressed portions of the bottoms of the tanks. These funnel-shaped members 19 are supported in position by means of the transverse rods or beams 21 passing through the funnel-shaped members and engaging with the bottom of the basins. When in normal position a space remains between the outer edges of the inverted funnel-shaped members 19 and the bottoms of the basins, to permit the flow of the water therethrough with force and agitation and insure a mixing of the chemicals and prevent any clogging of the spaces by the deposition of sediment.

Under drains 22 are provided for each of the basins 5, the said under drains being designed to discharge through pipes 22′ and 22″ into the central well 3. It will be readily apparent that the solution or mixture entering the basins 5 through the chemical supply pipes 11 will be heavier than the water and will tend to settle to the bottom of the basins. Owing to this fact a portion of the mixture will pass out through the under drains 22 into the central well 3 from which it is pumped by any suitable mechanism as the pump 68 and discharged as by the pipes 69 into the basin or basins not ordinarily receiving a direct supply of the chemical mixture from the elevated tanks 9. Owing to this feature of the invention all waste of the chemicals is prevented and an economical working of the plant obtained. This will be more readily understood when it is explained that the water may flow into and through one or more of the basins, not ordinarily supplied directly with fresh chemicals, and therein treated with the partially exhausted chemicals and then passes from the said basin or basins to the basins which are supplied directly with fresh chemicals. Valves 18ᶜ are provided by which the direct inflow of water to any of the downtakes 18 may be shut off. By this arrangement, shutting off the direct inflow of water to and permitting it to stand in a given basin, it is possible to thoroughly exhaust the chemical in the said basin while providing means whereby any lack of saturation of the water passing therethrough is made good in the next basin or basins.

The water from the basin in which it is last treated overflows into an annular trough 25 carried by the baffles of the circulation or mixing chamber 6 through a plurality of weirs 5′. A plurality of gates 27 are provided whereby the passage of water and chemicals from the conduit 25 to the circulation chamber 6 is controlled. This circulation chamber 6 is considerably deeper than the trough or run-way 25 and the bottom thereof is formed with transversely disposed ribs 28, the channels between the said ribs having drain pipes 29 located therein. Alternately arranged baffle plates 30 and 31 extend transversely entirely across the circulation chamber 6, the baffle 30 extending upwardly from the above mentioned ribs 28 and with their upper edges somewhat lower than the baffles 31 which are located over alternate ribs and between the baffles 30 and extend to a greater height than the baffles 30. Owing to this construction, it will be apparent that as the water passes through the circulation chamber 6 it will be given an irregular flow over the baffles 30 and under the baffles 31 and will be thoroughly mixed with the chemicals.

The remaining portion of the water passing through the weir box 12 is delivered to the chamber 6 below annular trough 25 by any suitable form of conduit such as indicated at 32. This raw or untreated water is mixed with the lime water from the basin 5 in the circulation chamber 6, the soda also being added to the water in the circulation chamber 6, where it is thoroughly mixed with the lime treated water.

From the circulation chamber 6 the water overflows into the outer annular trough or runway 33, which also overhangs the circulation chamber and forms part of the wall 7. The overflow of the water into this runway 33 is permitted by opening gates 34, similar to the above mentioned gates 27, and partitions 35 and 35$^a$ are provided by means of which the circulation chamber can be divided into independent sections.

From the outer trough or runway 33 the water is conveyed to an outer settling chamber 36, through passages 37 formed in the wall 7 and communicating at their upper ends with the runway 33 and at their lower ends with the lower portion of the chamber 36. This chamber 36 is protected by any suitable covering 38 supported upon the beams or girders 39, and columns 40.

Carried by the upper portions of the outer inclosing wall 41 of the chamber 36 is an overhanging trough 42 adapted to receive the overflow from the chamber 36 from the lower wall 42′ defining the trough 42. The outflow from this trough 42 is controlled by any suitable means such as the gates 43, and the final effluent is carried off by means of the conduit 44 to any desired destination, such as a filter.

The bottom of the outer chamber 36 is provided with a system of sludge-conduits or under drains for carrying away any sediment which might collect. As will be apparent from Fig. 5, these under drains are constituted by grooves or depressions 45 covered by slabs 46, provided with perforations through which the sediment can enter the grooves. In the present construction the grooves 45 are shown as discharging into the drains 47, which are located under the bottoms of the sector-shaped basins 5, though they could with equal propriety discharge into a portion of the central well 3.

The drains 45 in the bottom of the settling basin are disclosed as arranged in a series of concentric annular zones, each zone discharging into the gutter or sewer 47 through a separate outlet, the object being to secure the greatest economy in the amount of flushing water required. The zoning of the underdraining system forms no part of the present invention, but it is fully set forth and described in the co-pending application, filed the 15th day of January, 1907, by Harry H. Sutro, Serial No. 352,474.

Radial partitions 49 are employed to subdivide the outer chamber 36 into a series of compartments when desired, and the outer trough 42 carried by the wall 41 is placed in communication with the circulation chamber 6 by means of the low wall aforesaid.

Under certain conditions it is found necessary to treat the water with a coagulant and for such purpose the system shown and described above for mixing and settling is divided into segments as into two halves and under such condition the course of the water is as follows: The water passes from the saturators 5 through the weirs 5′ into the trough 25, from which it overflows into the baffle run-way 6. After passing about the run-way 6 over and under the baffles, as above described, it is discharged through the gate 34 which is opened into the segmental trough 33, thence through the weirs 37 into the bottom of the settling tank 36.

From the settling tank 36 the water overflows the low wall 42′ into the trough 42 and flows therein about said trough to the flume 50. The gate 62 being opened and the gate 62′ closed the water flows through the flume 50 and to the trough 25 upon the left hand side of the apparatus as shown in Fig. 1, it being assumed that the right hand side has been employed for treating with lime and soda. The gate 34 upon the left hand side of the apparatus is swung diagonally across the trough 25 to direct the flow from the flume 50 to the baffle run-way 6, the gates 53 and 35 remaining closed and the gate 51 being opened. From the baffle run-way 6 the water is discharged through the gate 34″ into the outer trough 33 and thence through the weirs 37 into the settling tank 36, thence over the lower wall 42′ into the trough 42, and by the manipulation of the gate 43 is discharged into the discharge pipe 44. Particular attention is invited to the specific form and arrangement of sector shaped basins 5 surrounded by the annular run-ways and circulation chambers, since owing to this arrangement a very compact and effective plant is produced by means of which any liquid such as water can be handled in comparatively large quantities and mixed with any desired chemical reagent.

What I claim is:—

1. In an apparatus for the chemical treatment of liquids, the combination of a plurality of basins, means for supplying a chemical to a portion of the basins, means for withdrawing the surplus from these basins and delivering it to the remaining basins, and a trough receiving the discharge from all of the basins.

2. In an apparatus for the chemical treatment of liquids, the combination of a plurality of basins, means for supplying a chemical to a portion of the basins, means for withdrawing the surplus from these basins and delivering it to the remaining basins, and a trough receiving the discharge from all of the basins, the said trough discharging into a circulation chamber.

3. In an apparatus for the chemical treatment of liquids, the combination of a basin, means for supplying a chemical to the basin, a trough receiving the discharge from the basin, and a circulation apartment into which the trough discharges.

4. In an apparatus for the chemical treatment of liquids, the combination of a plurality of basins, means for supplying a chemical to the basins, a common trough receiving the discharge from the basins, a circulation apartment into which the trough discharges, and baffles arranged in the circulation apartment.

5. In an apparatus for the chemical treatment of liquids, the combination of a basin, means for supplying a chemical to the basin, a trough receiving the discharge from the basin, a circulation apartment into which the trough discharges, and a second trough receiving the discharge from the circulation apartment.

6. In an apparatus for the chemical treatment of liquids, the combination of a basin, means for supplying a chemical to the basin, a trough receiving the discharge from the basin, a circulation apartment into which the trough discharges, and a second trough receiving the discharge from the circulation apartment and delivering into an outer chamber.

7. In an apparatus for the chemical treatment of liquids, the combination of a basin, a source of liquid supply, a circulation apartment, means for supplying a chemical to the basin, and means for dividing the liquid supply and delivering a portion to the basin, and a portion to the circulation apartment receiving the discharge from the basins.

8. In an apparatus for the chemical treatment of liquids, the combination of a plurality of segmental basins inclosing a central well, means for supplying a chemical to the basins, and means for withdrawing the surplus of the chemical from the basins into the central well.

9. In an apparatus for the chemical treatment of liquids, the combination of a plurality of segmental basins inclosing a central well, means for supplying a chemical to a portion of the basins, means for withdrawing the surplus of the chemical from these basins into the central well, and means for discharging from the central well into the remaining basins.

10. In an apparatus for the chemical treatment of liquids, the combination of a plurality of basins inclosing a central well, means for supplying a chemical to a portion of the basins, means for withdrawing the surplus of the chemical from these basins, and delivering it into the central well, means for discharging from the central well into the remaining basins, and means for mixing the effluent.

11. In an apparatus for the chemical treatment of liquids, the combination of a basin, an apartment receiving the discharge from the basin, means for supplying a chemical to the basin, a source of liquid supply, a weir receiving the liquid supply and dividing the same, and means for delivering a portion of the liquid supply into the basin, and a portion into the chamber.

12. In an apparatus for the chemical treatment of liquids, the combination of a basin, a compartment receiving the discharge from the basin, means for supplying a chemical to the basin, a source of liquid supply, a box weir receiving the liquid supply, partitions dividing the trough of the box weir into sections, means for delivering the overflow into one of the sections to the basin, and means for delivering the overflow into the opposite section into the compartment.

13. In an apparatus for the chemical treatment of liquids, the combination of a plurality of basins, means for supplying a chemical to the basins, and circulating and mixing means surrounding the basins and receiving the discharge therefrom.

14. In an apparatus for the chemical treatment of liquids, the combination of a basin, means for supplying a chemical to the basin, a circulation compartment receiving the discharge from the basin, walls inclosing a chamber receiving the discharge from the circulation compartment, and a discharge trough receiving the flow from the chamber.

15. In an apparatus for the chemical treatment of liquids, the combination of a basin, means for supplying a chemical to the basin, a circulation compartment receiving the discharge from the basin, walls inclosing a chamber receiving the discharge from the circulation compartment, means for removing from the chamber any sediment deposited therein, and means for carrying away the effluent from the said compartment.

16. In an apparatus for the chemical treatment of liquids, the combination of concentric walls, the inner wall inclosing a well, partitions dividing the space between the concentric walls into a plurality of basins, means for supplying a chemical to a portion of the basins, means for draining from these basins into the central well, and means for discharging from the central well into the remainder of the basins.

17. In an apparatus for the chemical treatment of liquids, the combination of an inner wall inclosing a well, a wall surrounding the inner wall, partitions subdividing the space between the walls into a plurality of basins, an outer wall surrounding the second-mentioned wall, and inclosing a circulation compartment between the two, means for draining from a portion of the basins into the central well, and means for discharging from the central well into the remainder of the basins, the circulation compartment receiving the discharge from all of the basins.

18. In an apparatus for the chemical treatment of liquids, the combination of a wall inclosing a central well, a wall inclosing the said wall, partitions sub-dividing the space between the two walls into a plurality of basins, a wall surrounding the second-mentioned wall and defining a circulation chamber between the two, and an outer wall surrounding the last-mentioned wall and defining a settling chamber between the two, the said basins discharging into the circulation chamber, and the circulation chamber into the settling chamber.

19. In an apparatus for the chemical treatment of liquids, the combination of an inclosing wall, partitions dividing the space within the wall into a plurality of basins, and a trough carried by the wall and receiving the discharge from the basins, and an overhanging annular trough carried by the wall and receiving the discharge from all of the basins.

20. In an apparatus for the chemical treatment of liquids, the combination of a basin, walls inclosing a circulation compartment, the said walls upon opposite sides of the compartment supporting troughs, one of the troughs receiving the discharge from the basins, and delivering it into a circulation compartment while the opposite trough receives the discharge from the circulation compartment.

21. In an apparatus for the chemical treatment of liquids, the combination of a basin, means for supplying a chemical to the basin, a circulation compartment divided into sections, the overflow from the basin passing into one of the sections, means for delivering the liquid from the said section into the opposite section, and means for treating the liquid with a second chemical during the delivery.

22. In apparatus for treating liquids with chemicals, the combination of a plurality of settling apartments which inclose a mixing channel, which in turn incloses a plurality of chemical basins and a well.

23. In apparatus for treating liquids with chemicals, the combination of a plurality of settling apartments, whose combined outer and inner sides, respectively, constitute circles and which inclose a mixing channel, which in turn incloses a plurality of chemical basins and a well.

24. In apparatus for treating liquids with chemicals, the combination of a plurality of settling apartments, whose combined outer and inner sides, respectively, constitute circles, and which inclose an annular mixing channel, which in turn incloses a plurality of chemical basins and a well.

25. In apparatus for treating liquids with chemicals, the combination of a plurality of settling apartments, whose combined outer and inner sides, respectively, constitute circles and which inclose an annular mixing channel, which in turn incloses a plurality of chemical basins and a circular well.

In testimony whereof, I affix my signature in presence of two witnesses.

ALEXANDER POTTER.

Witnesses:
H. T. DANGERFIELD,
T. L. FOUNTAIN.